United States Patent [19]
Kreh

[11] Patent Number: 5,171,477
[45] Date of Patent: Dec. 15, 1992

[54] CORROSION INHIBITION IN CHELANT SOLUTIONS

[75] Inventor: Robert P. Kreh, Jessup, Md.

[73] Assignee: W. R. Grace & Co.-Conn., New York, N.Y.

[21] Appl. No.: 708,335

[22] Filed: May 31, 1991

[51] Int. Cl.$^5$ .................. C23F 11/167; C23F 11/14
[52] U.S. Cl. ................. 252/389.23; 252/392; 252/389.62; 252/180; 210/700
[58] Field of Search ............ 252/389.23, 392, 389.62, 252/180; 210/700

[56] References Cited

U.S. PATENT DOCUMENTS

| | | | |
|---|---|---|---|
| 3,806,459 | 4/1974 | Petrey | 252/180 |
| 3,951,827 | 4/1976 | Burroughs et al. | 252/8.552 |
| 3,959,167 | 5/1976 | Hwa et al. | 210/699 |
| 4,442,009 | 4/1984 | O'Leary | 210/701 |
| 4,556,493 | 12/1985 | Cuisia | 210/699 |
| 4,649,025 | 3/1987 | Hwa et al. | 252/389.23 |
| 4,659,482 | 5/1987 | Chen | 210/699 |
| 4,778,655 | 10/1988 | Greaves | 210/698 X |
| 4,810,405 | 3/1989 | Waller et al. | 252/81 |
| 4,895,664 | 1/1990 | Chen | 210/701 |

FOREIGN PATENT DOCUMENTS 0225051 6/1987 European Pat. Off. .
78044895 12/1978 Japan .
59-012799 1/1984 Japan .

OTHER PUBLICATIONS

*The Nalco Water Handbook* 2nd edition, section 3.20, 1988.
*Betz Handbook of Industrial Water Conditioning* eighth edition 1980, p. 108.
Alkyl Phosphonates as Inhibitors for Metal Corrosion in Detergents Containing Chelating Agents; Hellsten et al, Tenside Detergents, 8(5) p. 237–247 (1971).
Chemical Abstracts (40) 3212, "Method of Treating Boilers" (for scale-removal and prevention) (Bersworth).

*Primary Examiner*—Robert L. Stoll
*Assistant Examiner*—Valiri Fee
*Attorney, Agent, or Firm*—James P. Barr

[57] ABSTRACT

The present invention is directed to a method of inhibiting corrosion in aqueous systems which employ amino acid chelants in concentrations which are corrosive to the metal surfaces in contact with the aqueous system. The method comprises adding to the system a corrosion inhibiting amount of 1-hydroxyethane-1,1-diphosphonic acid (HEDPA). The corrosion inhibiting amount is generally in the range of from 0.5% to 10% on the basis of the concentration of amino acid chelant in the system.

9 Claims, No Drawings

CORROSION INHIBITION IN CHELANT SOLUTIONS

FIELD OF THE INVENTION

This invention relates to a method of inhibiting corrosion in aqueous systems containing amino acid chelants and more specifically relates to a method treating the system with a corrosion inhibiting amount of 1-hydroxyethane-1,1-diphosphonic acid.

BACKGROUND OF THE INVENTION

Chelating agents have been used in a variety of applications including textile dyeing, hydrogen peroxide stabilization, pulping, removal of scale deposits, cleaning metal surfaces and detergents. Scale removal generally employs strongly caustic solutions of chelating agents such as ethylenediamine tetraacetic acid (EDTA) or nitrilotriacetic acid (NTA). Thus, for example U.S. Pat. No. 3,951,827 to Burroughs et al discloses scale removing compositions comprising a polyaminocarboxylic acid chelating agent (such as e.g. EDTA or NTA) a synergistic, water-soluble inorganic fluoride salt, and optionally, surfactants, freezing point depressants and buffering agents, and which is adjusted to a pH in the range 8 to 9 by the addition of a suitable base. Phosphonic acid/amino acid chelant mixtures, using high concentrations of each, have also been used to remove rust scale as disclosed in U.S. Pat. No. 3,806,458.

EP 225,015 discloses mixtures of amino acid chelant, organophosphonate and zinc, having respective concentrations of from 0 to 10 ppm, for use as corrosion inhibitors for mild steel. At these low concentrations, the amino acid chelant is not corrosive to the metal surfaces, however, the use of high concentrations of chelating agents often causes undesirable accelerated corrosion rates on the metal surfaces in the treated systems. Various alkyl phosphates have been used to minimize corrosion caused by detergents which contain NTA or EDTA. For example, Tenside Detergents 8(5),237(1971) discloses that the use of monoalkylphosphates and dialkylphosphates combined with fatty alcohols, alkyl polyglycol ethers or paraffins was effective in inhibiting corrosion of metals in contact with a chelate containing solution.

It has now been discovered that small amounts of a particular organophosphonate, namely 1-hydroxyethane-1,1-diphosphonic acid, surprisingly provides enhanced corrosion inhibiting properties in aqueous chelant solutions.

SUMMARY OF THE INVENTION

It is an object of this invention to provide a method for inhibiting corrosion in aqueous systems which contain high concentrations of amino acid chelant.

It is another object of this invention to provide a method of treating aqueous systems which employ relatively high concentrations of amino acid chelants to coordinate metal ions such as calcium, iron and magnesium, and to prevent or remove scale deposits from the metal surfaces of aqueous systems, wherein the treatment method prevents the acceleration of the corrosion rate of a metal surface in contact with the aqueous system.

In accordance with the present invention, there has been provided a method of inhibiting corrosion in aqueous systems which contain amino acid chelants comprising adding to the system a corrosion inhibiting amount of 1-hydroxyethane-1,1-diphosphonic acid (HEDPA). The corrosion inhibiting amount is typically in the range of from 0.5 to 10% on the basis of the concentration of the chelant.

DETAILED DESCRIPTION

The present invention is directed to a method of inhibiting corrosion in an aqueous system, and more specifically to a method of inhibiting corrosion due to the presence of high concentrations of amino acid chelants. It has now been found that the addition of a corrosion inhibiting amount of a particular organophosphonate to aqueous systems which contain high concentrations of amino acid chelants, is effective in inhibiting corrosion of metal surfaces in contact with the aqueous systems.

In general, scale removal in aqueous systems is effected by adding to the system a high concentration of an amino acid chelant. Typically these concentrations are greater than 200 ppm and are generally in the range of from 200 ppm to 10,000 ppm. Unfortunately, amino acid chelants in these concentrations are also known to be corrosive. In fact, the use of amino acid chelants at these concentrations often results in substantial corrosion and/or tuberculation of metal surfaces which are in contact with the treated aqueous systems.

It has now been discovered that the addition of a corrosion inhibiting amount of a particular organophosphonate, namely 1-hydroxyethane-1,1-diphosphonic acid, effectively inhibits the corrosive effects of amino acid chelants. This was surprising and unexpected in view of the ineffectiveness of other similar phosphonates such as nitrilotris(methylene)triphosphonic acid or hydroxyphosphonoacetic acid (see comparative Examples 2 and 3).

Another surprising feature of this invention is that the presence of relatively minor amounts of HEDPA effectively inhibits corrosion in aqueous systems having high concentrations of amino acid chelants. In fact, it has been found that the most effective concentrations of HEDPA in the amino acid chelant-containing aqueous solutions were typically in the range of from 0.5 to 10% on the basis of the concentration of the amino acid chelant It was surprising and unexpected that concentrations of HEDPA outside this range, particularly higher concentrations of HEDPA, did not effectively inhibit the corrosive effects of the amino acid chelant. Thus, it is considered an important feature of this invention that the concentration of HEDPA in the aqueous system be relatively low, generally in the range of 0.5 to 10% based on the concentration of the chelant, preferably between 1 and 5% and most preferably between 1 and 2%. The precise dosage of HEDPA depends, to some extent, on the nature of the aqueous system in which it is to be incorporated and the degree of protection desired. In general, however, the concentration maintained in the system can range from about 1 ppm to about 100 ppm. Within this range, generally low dosages about 50 ppm or less are preferred, and a dosage of greater than 10 ppm being preferred. The exact dosage amount required with respect to a particular aqueous system can readily be determined by one of ordinary skill in the art using conventional methods.

The method of the present invention is generally applicable to any aqueous system, but is considered particularly effective in systems where calcium ions are present in concentrations of greater than 50 ppm, i.e. where chelants are used in cleaning and removing $CaCO_3$ type scale deposits which form in industrial aqueous systems. Such systems include cooling water systems, heat exchangers, and the like. Those amino acid chelants which have been found to be effective in cleaning and removing $CaCO_3$ type scale and which are corrosive to metal surfaces when added in high concentrations include, but are not limited to, nitrilotriacetic acid, alkylpolyamine polyacetic acids as well as hydroxy-substituted derivatives thereof, such as e.g. ethylenediaminetetraacetic acid, diethylenetriaminepentaacetic acid, 1,3-propanediamine tetracetic acid, N-(hydroxyethyl)ethylenediamine tetraacetic acid, their corresponding ammonium and alkali metal salts, and mixtures thereof. These chelants are generally present in the aqueous systems in concentrations of greater than 200 ppm and are often added in concentrations of up to 10,000.

Without further elaboration, it is believed that one skilled in the art, using the preceding detailed description can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

A solution containing 99 ppm $CaSO_4$, 13 ppm $CaCl_2$, 55 ppm $MgSO_4$ and 176 ppm $NaHCO_3$ was prepared. To this solution was added 1,100 ppm of $CaCO_3$, 4,400 ppm EDTA, 30 ppm HEDPA and 1,500 ppm NaOH. After all solids had dissolved, the pH was adjusted to 8.5° C. This solution was stirred with a mild steel coupon at 54° C. for 24 hours. The coupon was then cleaned with steel wool, dried under vacuum for 17 hours at 60° C. and then weighed. The weight loss corresponded to a corrosion rate of 6 mils per year.

EXAMPLE 2

Example 1 was repeated with the omission of HEDPA and the corrosion rate was 57 mpy.

EXAMPLE 3

Example 1 was repeated using nitrilotris(methylene)triphosphonic acid in place of HEDPA and the corrosion rate was 49 mpy.

EXAMPLE 4

Example 1 was repeated using hydroxyphosphonacetic acid in place of HEDPA and the corrosion rate was 59 mpy.

EXAMPLES 5-8

Test water was prepared to simulate the actual aqueous systems found in cooling tower systems. The water contained 99 parts per million (ppm) $CaSO_4$, 13 ppm $CaCl_2$, 55 ppm $MgSO_4$ and 176 ppm $NaHCO_3$. To separate aliquots of the test water were added the additives listed in Table I. The solution was then adjusted to pH =8.5 with NaOH(aq). A clean, preweighed SAE 1010 mild steel coupon was suspended in 0.9 liters of test solution, which was stirred at 54° C. for 24 hours. The mild steel specimen was then cleaned, dried under vacuum at 60° C. and weighed. The corrosion rates, expressed in mils (thousandths of an inch) per year (mpy), were determined from this weight loss and are listed in Table I for each additive.

TABLE I

| Example | Chelant | ppm Chelant | Corrosion Rate (mpy) at different HEDPA Concentrations | | | | |
|---|---|---|---|---|---|---|---|
| | | | 0 ppm | 10 ppm | 30 ppm | 150 ppm | 300 ppm |
| 5 | N,N,N',N'-ethylenediaminetetraacetic acid | 1000 | 47 | 12 | 14 | 22 | 50 |
| 6 | N,N,N',N',N''-diethylenetriaminepentaacetic acid | 1000 | 84 | 9 | 21 | — | — |
| 7 | N,N,N',N'-1,3-propanediaminetetraacetic acid | 750 | — | 13 | — | — | — |
| 8 | N-hydroxyethyl-N,N',N'-ethylenediaminetriacetic acid | 500 | — | 9 | — | — | — |

— indicates that the corrosion rate was not evaluated at this dosage level.

I claim:

1. In an aqueous system having an amino acid chelant dissolved therein in a concentration sufficient to remove scale from the system and which is corrosive to metal surfaces in contact with the aqueous system, a method of inhibiting corrosion of the metal comprising adding to the system a corrosion inhibiting amount of 1-hydroxyethane-1,1-diphosphonic acid (HEDPA).

2. A method according to claim 1 wherein the amino acid chelant is selected from the group consisting of alkylpolyamine polyacetic acid, aminotriacetic acid, their corresponding hydroxy-substituted derivatives, ammonium and alkali metal salts and mixtures thereof.

3. A method according to claim 2 wherein the alkylpolyamine polyacetic acid is selected from the group consisting of N,N,N',N'-ethylenediaminetetraacetic acid, N,N,N'',N'',N'''-diethylenetriaminepentaacetic acid, N,N,N',N'-1,3-propanediaminetetraacetic acid, N-hydroxyethylethylenediamine-N,N',N'-triacetic acid.

4. A method according to claim 1 wherein the concentration of the amino acid chelant is greater than 200 ppm.

5. A method according to claim 1 wherein the corrosion inhibiting amount of HEDPA is from 0.5 to 10% on the basis of the concentration of the amino acid chelant in the system.

6. A method according to claim 1 wherein the corrosion inhibiting amount of HEDPA is from 1% to 5% on the basis of the concentration of the amino acid chelant in the system.

7. A method according to claim 1 wherein the corrosion inhibiting amount of HEDPA is from 1% to 2% on the basis of the concentration of the amino acid chelant in the system.

8. A method according to claim 2 wherein the amount of HEDPA added to the system is in a concentration range of from 0.5 to 10% on the basis of the concentration of the amino acid chelant in the system.

9. In an aqueous system having an amino acid chelant dissolved therein in a concentration of at least 200 ppm, a method of inhibiting corrosion of metal surfaces in contact with the aqueous system comprising adding to the system 1-hydroxyethane-1,1-diphosphonic acid in a concentration of from 0.5% to 10% on the basis of the concentration of the amino acid chelant in the system, and wherein the amino acid chelant is selected from the group consisting of alkylpolyamine polyacetic acid, amino triacetic acid, their corresponding hydroxy-substituted derivatives, ammonium and alkali metal salts, and mixtures thereof.

* * * * *